United States Patent [19]

Comparato et al.

[11] 4,357,883
[45] Nov. 9, 1982

[54] BED DRAIN COVER ASSEMBLY FOR A FLUIDIZED BED

[75] Inventors: Joseph R. Comparato, Bloomfield; Martin Jacobs, Hartford, both of Conn.

[73] Assignee: Combustion Engineering, Inc., Windsor, Conn.

[21] Appl. No.: 291,600

[22] Filed: Aug. 10, 1981

[51] Int. Cl.³ .............................................. F23G 5/04
[52] U.S. Cl. ....................................... 110/245; 432/58; 122/4 D; 34/57 A; 414/147
[58] Field of Search .................. 414/147; 110/245; 122/4 D; 34/57 A; 432/58

[56] References Cited

U.S. PATENT DOCUMENTS

| 611,516 | 9/1898 | Sedlmayer | 414/147 |
|---|---|---|---|
| 1,482,677 | 2/1924 | Dunten | 414/147 |
| 3,411,465 | 11/1968 | Shirai | 110/245 |
| 3,769,922 | 11/1973 | Furlong et al. | 122/4 D |
| 3,910,235 | 10/1975 | Highley | 122/4 D |
| 4,009,121 | 2/1977 | Luckenbach | 122/4 D |
| 4,103,646 | 8/1978 | Yerushalmi et al. | 122/4 D |
| 4,159,682 | 7/1979 | Fitch et al. | 110/245 |
| 4,227,488 | 10/1980 | Stewart | 122/4 D |
| 4,312,302 | 1/1982 | Kollerup | 110/245 |

FOREIGN PATENT DOCUMENTS 456822 7/1968 Switzerland ...................... 110/245

Primary Examiner—Henry C. Yuen
Attorney, Agent, or Firm—Robert L. Olson

[57] ABSTRACT

A loose fitting movable cover plate (36), suitable for the severe service encountered in a fluidized bed combustor (10), restricts the flow of solids into the combustor drain lines (30) during shutdown of the bed. This cover makes it possible to empty spent solids from the bed drain lines which would otherwise plug the piping between the drain and the downstream metering device. This enables use of multiple drain lines each with a separate metering device for the control of solids flow rate.

3 Claims, 3 Drawing Figures

BED DRAIN COVER ASSEMBLY FOR A FLUIDIZED BED

BACKGROUND OF THE INVENTION

The Government of the United States of America has rights in this invention pursuant to Contract No. EX-76-C-01-2473 awarded by the U.S. Department of Energy.

Due to increasing concern about the effect of certain pollutants that result from coal burning, alternate methods for burning coal are being tried. One such alternate method that is employed to reduce the production of oxides of sulphur uses a fluidized bed, in which the force of flowing combustion air is used to maintain coal particles in a quasi-fluid state. Limestone particles forming the majority of material in the bed, and the heat of combustion from the coal causes the limestone to calcine and release carbon dioxide thus forming quick lime. Quick lime actively reacts with sulphur trioxide or oxygen and sulphur dioxide to produce a calcium sulphate coating on the quick lime. The sulphur content of the stack emission is thereby greatly reduced.

SUMMARY OF THE INVENTION

In accordance with the invention, a cover plate suitable for the high temperature conditions found in a fluidized bed, is located above the bed drain opening. A shaft operated from outside the bed moves the plate to a position above the drain opening thus forming a material dam. This obstructs the flow of additional solids into the drain line while the metering devices remove existing solids from the line below the drain cover. The shaft moving the cover penetrates the air distribution means for the fluidization air entering the bed. A loose fitting journal is used for the shaft guide. A covering above the journal prevents solids from reaching the bearing surface. Air from below the bed is at higher pressure than in the bed and causes a small flow of air through the journal which further keeps the bearing clean and cool. The bed is operated at about 1550 F. to optimize the sulphur reaction. Due to mechanical limitations, the metering devices for the control of bed drain solids are necessarily located at a substantial distance below the drain exit from the bed. When the metering equipment (rotary air lock) is stopped, a head of solid material above the metering device tends to coalesce, forming a plug. When the metering device is then restarted, flow is not possible.

The bed drain cap assembly is a loose fitting, freely movable obstruction which serves to block the flow of solids into the drain. Thus, the line below the drain, yet above the metering device, can be cleared of material. This prevents the conditions which would otherwise cause pluggage.

DESCRIPTION OF THE PREFERRED EMBODIMENT

Figure 1:
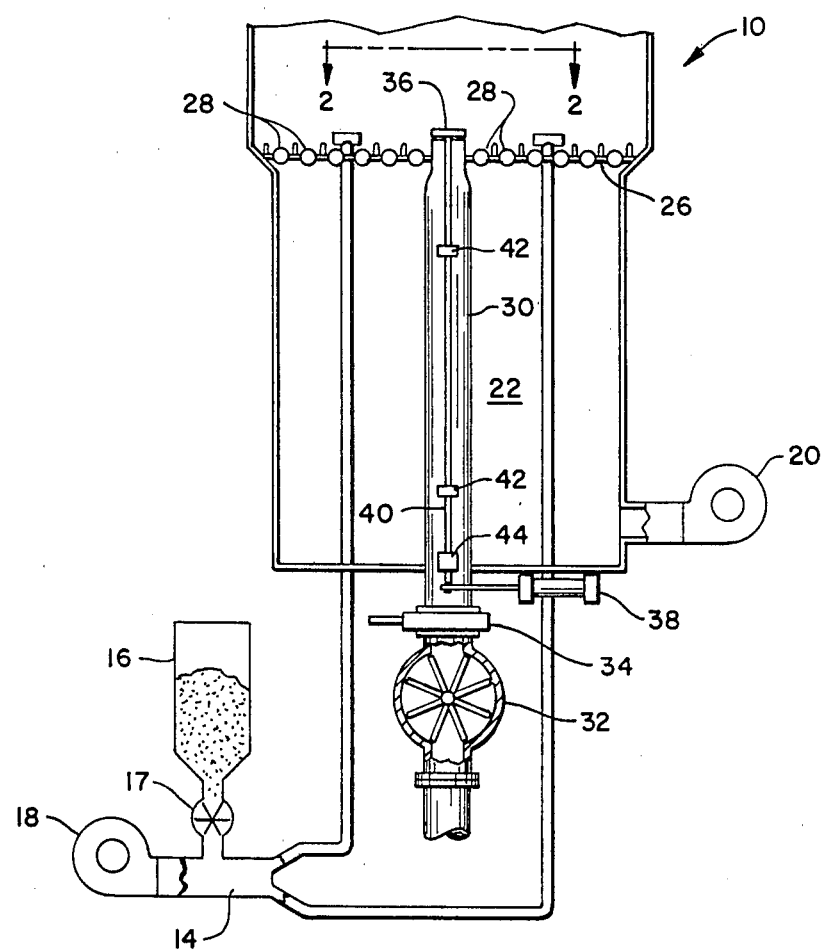
FIG. 1 is a sectional side view through the lower end of a fluidized bed combustion chamber.
Figure 2:
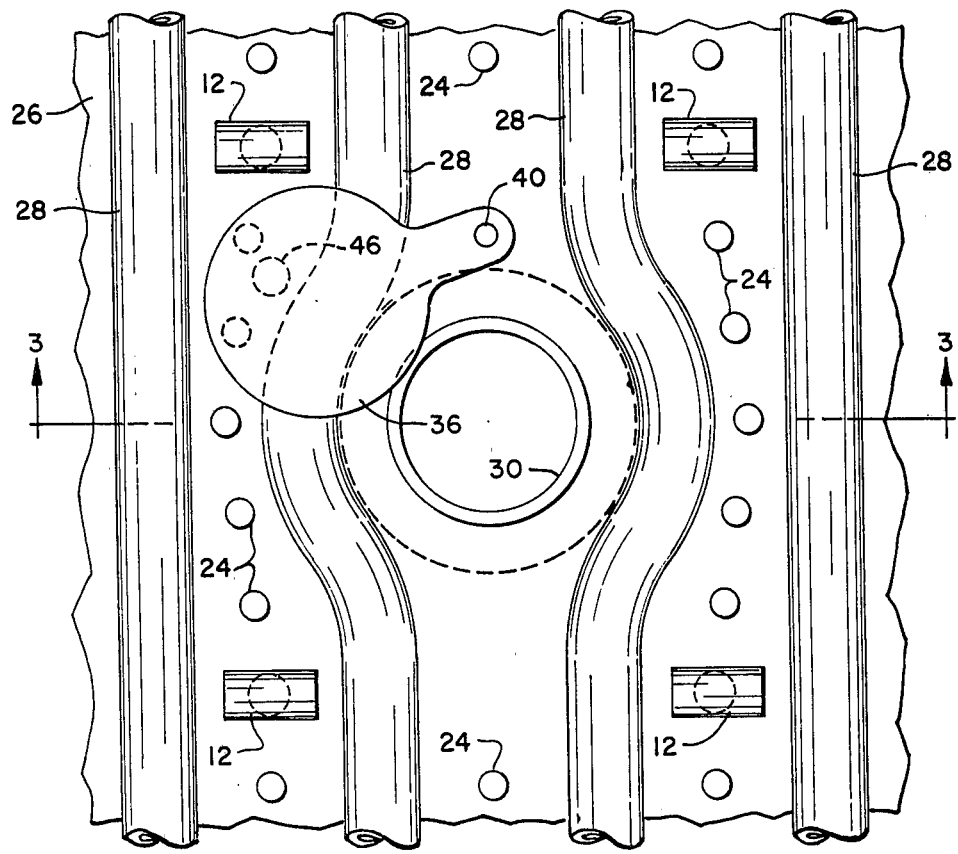
FIG. 2 is an enlarged plan view taken on line 2—2 of FIG. 1 showing the drain opening valve in the open position.

Looking now to FIG. 1 of the drawings, numeral 10 designates a fluidized bed unit in which coal is burned. A mixture of coal and limestone is introduced into the fluidized bed by means of openings 12 (FIG. 2) from plenum 14 (FIG. 1). The mixture is introduced into plenum 14 from hopper 16 by way of rotary air lock 17, and is carried in a air stream from fan 18. The air for supporting combustion of the coal and for fluidizing the bed material is introduced by means of fan 20, plenum 22, and hooded openings 24 (FIG. 3) in the grate 26. The air has sufficient velocity flowing through the openings 24 to maintain the coal and limestone in a fluidized state. The grate is cooled by fluid flowing through tubes 28. These tubes are steam generating surface.

The fluidized bed is sufficiently cooled by inbed surface so that the normal bed operating temperature is controlled at approximately 1550 F. Ash remains solid at this temperature, so there is no molten slag to foul up the air distributor or other equipment. The limestone is provided to combine with the sulphur in the coal to form calcium sulphate (a solid). Thus, virtually little sulphur escapes in the environment as $SO_2$ or other obnoxious gas.

Figure 3:
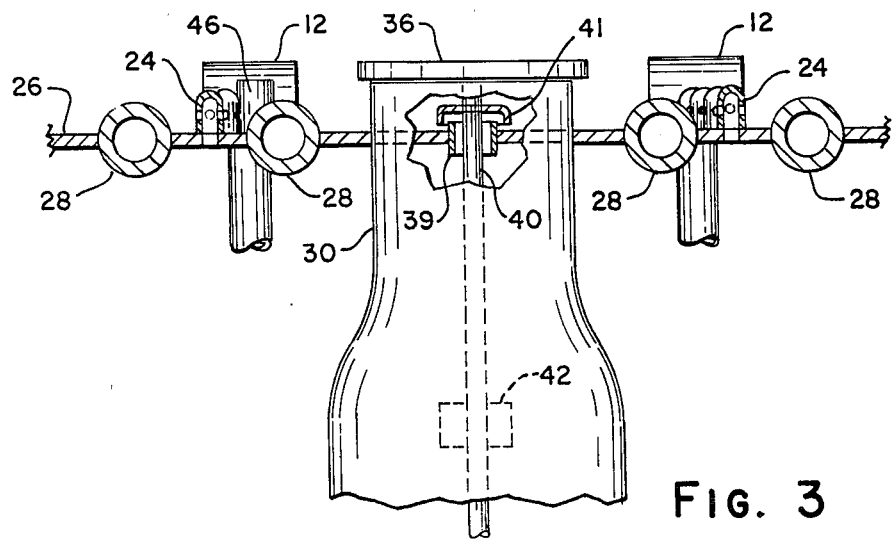
FIG. 3 is a view taken on line 3—3 of FIG. 2, only showing the drain opening valve in the closed position.

A drain line 30 is provided for the fluidized bed, through which ash and spent limestone are gravity discharged therefrom. The ash and spent limestone passes through drain line 30, as well as through a rotary air lock valve 32, and from there can be disposed of in any manner. A gate valve 34 is used to isolate the rotary air lock valve when performing maintenance on it. When the fluidized bed is to be shut down, a rotary cover or valve 36 can be rotated to its closed position by any suitable actuator, such as a pneumatic actuating device 38, shown in FIG. 1. FIG. 3 shows the cap or valve in its closed position. The actuating rod 40 is rotatably guided within a pair of guide members 42 which are secured to the outside of drain line 30. A stuffing box 44 prevents leakage from air chamber 22 during operation. During normal operation, the valve 36 rests on member 46 (FIGS. 2 and 3), which aids in preventing the valve or cover from becoming bent due to the weight of the fluidized bed material. The valve 36 rotates in a horizontal plane between its open and closed position. Thus, it does not have to lift the weight of the material above it when being open. Also, particles cannot wedge between it and the upper edge of the drain line 30 when it is being closed.

The upper end of actuating rod 40 passes through a loose-fitting journal 39 (FIG. 3). A hood 41 is secured to the rod 40. Since the pressure in plenum 22 is higher than that above the grate, there is a continuous flow of air upward through the journal 39. This plus the hood 41 not only cools the rod 40, but prevents solid particles from jamming the actuator.

The operation of the fluidized bed should now be obvious. During operation of the fluidized bed, coal and limestone are carried in an air stream from hopper 16, and introduced to the fluidized bed through openings 12 in grate 26. Air is introduced through openings 24 to fluidize the coal and limestone, and support combustion of the coal. The hot combustion gases pass upwardly from the furnace into a boiler (not shown). The spent limestone, after combining with the sulphur in the coal, is gravity discharged through drain line 30. Valves 34 and 36 are opened, and rotary air lock 32 is being rotated, to remove the residue. When the unit is to be shut down, the fans 18 and 20 are deactivated, along with rotary air locks 17 and 32. The cover or valve 36 is rotated to its closed position and gate valve 34 is closed. When it is desired to start the unit back up again, the process is reversed. Admittedly, some coal and unspent limestone particles may be discharged through the drain line 30 during operation of the fluidized bed. However, the spent limestone and ash are generally more dense than the coal and fresh limestone. Since the drain line opening is right at the grate level, these are particles most likely to be gravity discharged. Also, the coal and fresh limestone is initially introduced into the fluidized bed with considerable velocity, which throws these particles well up into the bed.

We claim:

1. A furnace having a fluidized bed including a grate, means for introducing coal and limestone into the bed, means for introducing air through openings in an air register, said air being introduced in sufficient quantity and at such velocity to maintain continuous combustion of the coal and to fluidize the coal and limestone in the bed, a drain line through which ash and spent limestone can be gravity discharged from the bed while it is being operated, the drain line having an upper end opening above and closely adjacent to the grate, a valve rotatably positioned to open or close the upper end opening of the drain line, the valve being rotatable in a horizontal plane, actuator means which passes through the grate for actuating the valve from beneath the fluidized bed, air passage means surrounding the actuator means where it passes through the grate for keeping the actuator clean and cool, hood means attached to the actuator means just above the grate to prevent solids from jamming the actuator means, and a rotary lock means positioned in the lower portion of the drain line.

2. The furnace set forth in claim 1, wherein the air register includes fluid cooled tubes.

3. The furnace set forth in claim 2, wherein the coal and limestone are introduced to the fluidized bed from beneath through openings in the air register.

* * * * *